(12) United States Patent
Park et al.

(10) Patent No.: US 12,276,431 B2
(45) Date of Patent: Apr. 15, 2025

(54) CONTROL DEVICE, AIR CONDITIONER AND CONTROL METHOD THEREOF

(71) Applicant: Samsung Electronics Co., Ltd., Suwon-si (KR)

(72) Inventors: Gunhyuk Park, Suwon-si (KR); Kanghyeok Kwon, Suwon-si (KR); Jeongmi Woo, Suwon-si (KR); Yunsue Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 17/430,506

(22) PCT Filed: Aug. 4, 2021

(86) PCT No.: PCT/KR2021/010258
§ 371 (c)(1),
(2) Date: Aug. 12, 2021

(87) PCT Pub. No.: WO2022/039419
PCT Pub. Date: Feb. 24, 2022

(65) Prior Publication Data
US 2022/0307716 A1    Sep. 29, 2022

(30) Foreign Application Priority Data

Aug. 20, 2020 (KR) ......................... 10-2020-0104831

(51) Int. Cl.
*F24F 11/46* (2018.01)
*F24F 11/56* (2018.01)
(Continued)

(52) U.S. Cl.
CPC ............. *F24F 11/46* (2018.01); *F24F 11/56* (2018.01); *F24F 11/63* (2018.01); *F24F 2110/12* (2018.01)

(58) Field of Classification Search
CPC .. F24F 11/46; F24F 11/56; F24F 11/63; F24F 2110/12
(Continued)

(56) References Cited

U.S. PATENT DOCUMENTS 8,386,082 B2    2/2013  Oswald
9,367,825 B2 *  6/2016  Steven ............. G06Q 10/06314
(Continued)

FOREIGN PATENT DOCUMENTS

CN    105283817 B  *  3/2019  ............. F24F 11/30
CN    110018699 A  *  7/2019  ............. F24F 11/30
(Continued)

OTHER PUBLICATIONS

International Search Report dated Nov. 22, 2021, issued in International Patent Application No. PCT/KR2021/010258.
(Continued)

*Primary Examiner* — Crystal J Barnes-Bullock
(74) *Attorney, Agent, or Firm* — Jefferson IP Law, LLP

(57) ABSTRACT

A control device, an air conditioner, and a control method thereof are provided. The control device includes a communication interface configured to communicate with an external device, and a processor configured to control the communication interface to receive indoor and outdoor environment information and user control information, and the processor is configured to predict an indoor temperature over time through a temperature prediction model based on the received indoor and outdoor environment information and the user control information, obtain a corresponding candidate setting temperatures, obtain temperature control schedules, predict energy consumptions of the obtained temperature control schedules, respectively, through a trained energy prediction model, identify a temperature control schedule with the smallest predicted energy con-
(Continued)

sumption as an optimal temperature control schedule, and transmit control information over time to an air conditioner during a pre-set power saving operation time based on the identified optimal temperature control schedule.

15 Claims, 17 Drawing Sheets

(51) Int. Cl.
*F24F 11/63* (2018.01)
*F24F 110/12* (2018.01)

(58) Field of Classification Search
USPC .......................................................... 700/276
See application file for complete search history.

(56) References Cited

U.S. PATENT DOCUMENTS

| | | | |
|---|---|---|---|
| 9,377,209 B2 | 6/2016 | Kopp | |
| 9,377,212 B2 | 6/2016 | Wallaert | |
| 9,377,791 B2 | 6/2016 | Guidotti et al. | |
| 9,501,071 B2 | 11/2016 | Shah | |
| 9,618,227 B2 | 4/2017 | Drew | |
| 9,709,292 B2 | 7/2017 | Steinberg | |
| 9,739,496 B2 | 8/2017 | Seem et al. | |
| 9,810,442 B2* | 11/2017 | Matsuoka | F24F 11/62 |
| 10,001,791 B2 | 6/2018 | Lagerstedt et al. | |
| 10,012,404 B2 | 7/2018 | Munier et al. | |
| 10,012,406 B2 | 7/2018 | Kim | |
| 10,228,153 B2 | 3/2019 | Lee et al. | |
| 10,254,001 B2 | 4/2019 | Yoshikawa | |
| 10,544,956 B2* | 1/2020 | Mady | F24F 11/64 |
| 10,606,290 B2 | 3/2020 | Lagerstedt et al. | |
| 10,612,808 B2* | 4/2020 | Joy | G05B 13/026 |
| 10,619,876 B2 | 4/2020 | Matsuoka et al. | |
| 10,697,662 B2* | 6/2020 | Matsuoka | F24F 11/62 |
| 11,675,322 B2* | 6/2023 | Du | G06N 3/08 |
| | | | 700/278 |
| 2016/0054019 A1 | 2/2016 | Lee et al. | |
| 2016/0169547 A1 | 6/2016 | Matsuoka et al. | |
| 2019/0024925 A1 | 1/2019 | Wu et al. | |
| 2019/0353376 A1 | 11/2019 | Bigg et al. | |
| 2020/0003441 A1 | 1/2020 | Brahme et al. | |
| 2020/0116375 A1 | 4/2020 | Heintzelman et al. | |
| 2020/0248916 A1 | 8/2020 | Tai et al. | |
| 2023/0400211 A1* | 12/2023 | Matsuoka | F24F 11/62 |

FOREIGN PATENT DOCUMENTS

| | | | | |
|---|---|---|---|---|
| CN | 109461094 B | * | 10/2020 | ............. F24F 11/00 |
| CN | 113614460 B | * | 8/2022 | |
| CN | 112967152 B | * | 3/2023 | ............. G06F 30/20 |
| CN | 117190406 A | * | 12/2023 | |
| EP | 3584666 A1 | * | 12/2019 | ............. F24F 11/30 |
| EP | 3588232 A1 | * | 1/2020 | ............. G05B 13/02 |
| FR | 3001068 A1 | * | 7/2014 | ............. F24F 11/30 |
| JP | 11-014119 A | | 1/1999 | |
| JP | 3549710 B2 | | 8/2004 | |
| JP | 2008-070093 A | | 3/2008 | |
| JP | 2014119218 A | * | 6/2014 | |
| JP | 6225419 B2 | | 11/2017 | |
| JP | 6807556 B2 | * | 1/2021 | ............. F24F 11/46 |
| KR | 10-2015-0071563 A | | 6/2015 | |
| KR | 10-2015-0131913 A | | 11/2015 | |
| KR | 10-2016-0002993 A | | 1/2016 | |
| KR | 10-2016-0023094 A | | 3/2016 | |
| KR | 10-2020-0043781 A | | 4/2020 | |
| KR | 10-2103006 B1 | | 5/2020 | |
| WO | 2014/172374 A1 | | 10/2014 | |
| WO | WO-2015151363 A1 | * | 10/2015 | .......... F24F 11/0015 |
| WO | 2016/005512 A1 | | 1/2016 | |
| WO | WO-2017056403 A1 | * | 4/2017 | ............. F24F 11/46 |
| WO | WO-2022227610 A1 | * | 11/2022 | ............. F24F 11/46 |

OTHER PUBLICATIONS

Learning Agent for a Heat-Pump Thermostat with a Set-Back Strategy Using Model-Free Reinforcement Learning, Energies 2015.
ANN-Based Prediction and Optimization of Cooling System in Hotel Rooms, Energies 2015.
Prediction models and control algorithms for predictive applications of setback temperature in cooling systems, Applied Thermal Engineering 2017.

* cited by examiner

FIG. 12

| TEMPERATURE CONTROL SCHEDULE | PEAK VALUE(Kwh) | ENERGY CONSUMPTION FOR CERTAIN TIME(Kwh) |
|---|---|---|
| FIRST SCHEDULE | 8 | 400 |
| SECOND SCHEDULE | 13 | 340 |
| THIRD SCHEDULE | 10 | 360 |
| FOURTH SCHEDULE | 15 | 350 |
| FIFTH SCHEDULE | 5 | 420 |

CONTROL DEVICE, AIR CONDITIONER AND CONTROL METHOD THEREOF

TECHNICAL FIELD

The disclosure relates to a control device, an air conditioner, and a control method thereof. More particularly, the disclosure relates to a control method which effectively manages energy, an air conditioner, and a control method thereof.

BACKGROUND ART

Among the various control systems installed in a building, an air conditioning system (Heating, Ventilation & Air Conditioning (HVAC) system) consumes the highest percentage in energy consumption. Although much energy is consumed in controlling a HVAC system, the control of the HVAC system cannot be controlled by simply considering the energy alone because many elements such as outside environment, characteristics of a building, and comfort of an occupant are to be considered.

Control of many HVAC systems of the related art are carried out reliant on a manager. In a building stationed with a manager, a skilled manager controls the HVAC system based on a manual or his or her knowhow. However, the control of the HVAC system in a building with no skilled manager or in a home is performed inefficiently. Accordingly, research on efficient methods to control the HVAC system has been underway for some time. However, most of the research in progress is on methods of controlling the HVAC system efficiently in a typical situation where a person is in occupation.

In fact, there is no research underway on efficiently controlling the HVAC system when there is no occupant or when there is one or two persons in occupation from an energy reduction perspective. In general, the HVAC system is turned-off when there is no occupant, or controlled in a setback method of controlling the HVAC system at a certain temperature. When the HVAC system is turned-off, energy is not consumed during the off period. However, when the HVAC system is restarted, because the HVAC system temporarily consumes significant energy, a turning-off method may consume much more energy than the setback method considering a total time. In addition, because the setback method also controls the HVAC system at a certain temperature, energy is not consumed efficiently. Accordingly, there is a need for a method which optimizes energy being consumed in HVAC systems when there are no occupants or some persons are in occupation.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a control device which optimizes energy being consumed in a HVAC system when there are no occupants or when some persons are in occupation, an air conditioner, and a control method thereof.

Additional aspects will be set forth in part in the description which follows and, in part, will be apparent from the description, or may be learned by practice of the presented embodiments.

Solution to Problem

In accordance with an aspect of the disclosure, a control device is provided. The control device includes a communication interface configured to communicate with an external device, and a processor configured to control the communication interface to receive indoor and outdoor environment information and user control information, and the processor is configured to predict an indoor temperature over time through a temperature prediction model trained based on the received indoor and outdoor environment information and the user control information, obtain a plurality of corresponding candidate setting temperatures based on the predicted indoor temperature over time, obtain a plurality of temperature control schedules based on the plurality of obtained candidate setting temperatures, predict energy consumption of the plurality of obtained temperature control schedules, respectively, through a trained energy prediction model, identify a temperature control schedule with the smallest predicted energy consumption as an optimal temperature control schedule, and control the communication interface to transmit control information over time to an air conditioner during a pre-set power saving operation time based on the identified optimal temperature control schedule.

The processor may be configured to predict an indoor temperature at respective points-in-time according to a pre-set time interval, obtain a plurality of candidate setting temperatures at the respective points-in-time corresponding to the predicted indoor temperature at the respective points-in-time, and obtain the plurality of temperature control schedules by combining the plurality of obtained candidate setting temperatures at the respective points-in-time.

The processor may be configured to predict energy consumption of the respective temperature control schedules during a time until a point-in-time at which a temperature or energy consumption matches with a pre-set energy prediction time condition after the pre-set power saving operation time.

The pre-set energy prediction time condition may be at least one from among a point-in-time at which an indoor temperature is predicted as matching with a setting temperature after the pre-set power saving operation time, a point-in-time at which the indoor temperature is predicted as within a pre-set range with the setting temperature, a point-in-time at which a first energy consumption over time based on restarting after turning-off the air conditioner during the pre-set power saving operation time and a second energy consumption over time based on operating the air conditioner in a pre-set temperature range during the pre-set power saving operation time are predicted as matching, or a point-in-time at which the first energy consumption and the second energy consumption are predicted as being within a pre-set range.

The pre-set energy prediction time condition may further include a condition of a point-in-time at which a rate of change of the first energy consumption and a rate of change of the second energy consumption are predicted as matching or within a pre-set range.

The processor may be configured to obtain the plurality of temperature control schedules based on a pre-set limiting condition.

The pre-set limiting condition may be at least one from among matching of an indoor temperature with a pre-set setting temperature at a point-in-time at which the pre-set power saving operation time ends, limiting a maximum peak value of energy consumption, limiting energy consumption during a pre-set time, or maintaining a pre-set range in comfort level.

The plurality of candidate setting temperatures may be a temperature less than or equal to a change temperature of the predicted indoor temperature in a cooling mode or temperature greater than or equal to a change temperature of the predicted indoor temperature in a heating mode when the air conditioner is turned-off based on the predicted indoor temperature over time.

The environment information may include at least one from among an indoor and outdoor temperature, an indoor and outdoor humidity, a date, a day of a week, a time, whether or not it is a holiday, or whether or not a user is present.

In accordance with another aspect of the disclosure, an air conditioner is provided. The air conditioner includes a sensor configured to detect indoor environment information, a communication interface configured to communicate with an external device, and a processor configured to control the communication interface to receive outdoor environment information, and the processor is configured to predict an indoor temperature over time through a temperature prediction model trained based on the detected indoor environment information, the received outdoor environment information, and user control information, obtain a plurality of corresponding candidate setting temperatures based on the predicted indoor temperature over time, obtain a plurality of temperature control schedules based on the plurality of obtained candidate setting temperatures, predict energy consumption of the plurality of obtained temperature control schedules, respectively, through a trained energy prediction model, identify a temperature control schedule with the smallest predicted energy consumption as an optimal temperature control schedule, and operate during a pre-set power saving operation time based on the identified optimal temperature control schedule.

The processor may be configured to predict an indoor temperature at respective points-in-time according to a pre-set time interval, obtain a plurality of candidate setting temperatures at respective points-in-time corresponding to the predicted indoor temperature at the respective points-in-time, and obtain the plurality of temperature control schedules by combining the plurality of obtained candidate setting temperatures at the respective points-in-time.

The processor may be configured to predict energy consumption of the respective temperature control schedules during a time until a point-in-time at which a temperature or energy consumption matches with a pre-set energy prediction time condition after the pre-set power saving operation time.

The pre-set energy prediction time condition may be at least one from among a point-in-time at which an indoor temperature is predicted as matching with a setting temperature after the pre-set power saving operation time, a point-in-time at which the indoor temperature is predicted as within a pre-set range with the setting temperature, a point-in-time at which a first energy consumption over time based on restarting after turning-off the air conditioner during the pre-set power saving operation time and a second energy consumption over time based on operating the air conditioner in a pre-set temperature range during the pre-set power saving operation time are predicted as matching, or a point-in-time at which the first energy consumption and the second energy consumption are predicted as being within a pre-set range.

The pre-set energy prediction time condition may further include a condition of a point-in-time at which a rate of change of the first energy consumption and a rate of change of the second energy consumption are predicted as matching or within a pre-set range.

The processor may be configured to obtain the plurality of temperature control schedules based on a pre-set limiting condition.

The pre-set limiting condition may be at least one from among matching of an indoor temperature with a pre-set setting temperature at a point-in-time at which the pre-set power saving operation time ends, limiting a maximum peak value of energy consumption, limiting energy consumption during a pre-set time, or maintaining a pre-set range in comfort level.

The plurality of candidate setting temperatures may be a temperature less than or equal to a change temperature of the predicted indoor temperature in a cooling mode or temperature greater than or equal to a change temperature of the predicted indoor temperature in a heating mode when the air conditioner is turned-off based on the predicted indoor temperature over time.

The environment information may include at least one from among an indoor and outdoor temperature, an indoor and outdoor humidity, a date, a day of a week, a time, whether or not it is a holiday, or whether or not a user is present.

In accordance with another aspect of the disclosure, a control method of an air conditioner is provided. The control method includes obtaining indoor and outdoor environment information, predicting an indoor temperature over time through a temperature prediction model trained based on the obtained indoor and outdoor environment information and user control information, obtaining a plurality of corresponding candidate setting temperatures based on the predicted indoor temperature over time, obtaining a plurality of temperature control schedules based on the plurality of obtained candidate setting temperatures, predicting energy consumption of the plurality of obtained temperature control schedules, respectively, through a trained energy prediction model, identifying a temperature control schedule with the smallest predicted energy consumption as an optimal temperature control schedule, and operating during a pre-set power saving operation time based on the identified optimal temperature control schedule.

The predicting the indoor temperature may include predicting an indoor temperature at respective points-in-time according to a pre-set time interval, and the obtaining the plurality of candidate setting temperatures may include obtaining a plurality of candidate setting temperatures at respective points-in-time corresponding to the predicted indoor temperature at the respective points-in-time.

The obtaining the plurality of temperature control schedules may include obtaining the plurality of temperature control schedules by combining the plurality of obtained candidate setting temperatures at respective points-in-time.

The predicting the energy consumption may include predicting energy consumption of the respective temperature control schedules during a time until a point-in-which a temperature or energy consumption matches with a pre-set energy prediction time condition after the pre-set power saving operation time.

The pre-set energy prediction time condition may be at least one from among a point-in-time at which an indoor temperature is predicted as matching with a setting temperature after the pre-set power saving operation time, a point-in-time at which the indoor temperature is predicted as within a pre-set range with the setting temperature, a point-in-time at which a first energy consumption over time based on restarting after turning-off the air conditioner during the pre-set power saving operation time and a second energy consumption over time based on operating the air conditioner in a pre-set temperature range during the pre-set power saving operation time are predicted as matching, or a point-in-time at which the first energy consumption and the second energy consumption are predicted as being within a pre-set range.

The pre-set energy prediction time condition may further include a condition of a point-in-time at which a rate of change of the first energy consumption and a rate of change of the second energy consumption are predicted as matching or within a pre-set range.

The obtaining the plurality of temperature control schedules may include obtaining the plurality of temperature control schedules based on a pre-set limiting condition.

The pre-set limiting condition may be at least one from among matching of an indoor temperature with a pre-set setting temperature at a point-in-time at which the pre-set power saving operation time ends, limiting a maximum peak value of energy consumption, limiting energy consumption during a pre-set time, or maintaining a pre-set range in comfort level.

The plurality of candidate setting temperatures may be a temperature less than or equal to a change temperature of the predicted indoor temperature in a cooling mode or temperature greater than or equal to a change temperature of the predicted indoor temperature in a heating mode when the air conditioner is turned-off based on the predicted indoor temperature over time.

The environment information may include at least one from among an indoor and outdoor temperature, an indoor and outdoor humidity, a date, a day of a week, a time, whether or not it is a holiday, or whether or not a user is present.

Advantageous Effects of Invention

According to various embodiments of the disclosure, the air conditioner, the control device, and the control method may optimize energy consumption during a power saving operation time such as when there are no occupants.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

FIG. 12 is a diagram illustrating a process of obtaining a temperature control schedule which considers a limiting condition according to an embodiment of the disclosure;

Throughout the drawings, like reference numerals will be understood to refer to like parts, components, and structures.

MODE FOR THE INVENTION

Figure 1:
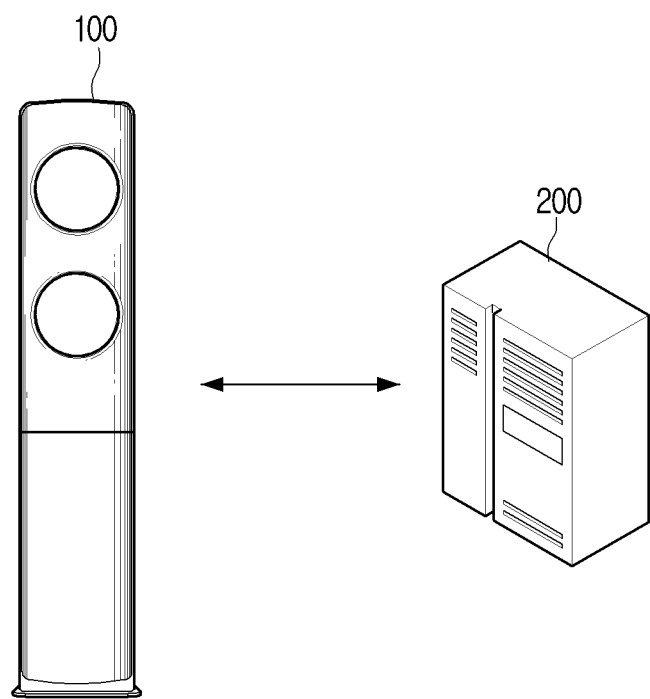
FIG. 1 is a diagram illustrating an air conditioning system according to an embodiment of the disclosure.

The following description with reference to the accompanying drawings is provided to assist in a comprehensive understanding of various embodiments of the disclosure as defined by the claims and their equivalents. It includes various specific details to assist in the understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the terms such as "comprise" or "include" are used herein to designate a presence of a characteristic, number, operation, element, component, or a combination thereof, and not to preclude a presence or a possibility of adding one or more of other characteristics, numbers, operations, elements, components or a combination thereof. When a certain element is indicated as being "coupled with/to" or "connected to" another element, it may be understood as the certain element being directly coupled with/to or connected to the other element, or as other element being present therebetween. On the other hand, when a certain element is indicated as "directly coupled with/to" or "directly connected to" another element, it may be understood as other element not being present therebetween.

The terms "module" or "part" used in the embodiments herein perform at least one function or operation. Further, the "module" or "part" may perform a function or an operation with a hardware, a software, or a combination of the hardware and software. Further, a plurality of "modules" or a plurality of "parts", except for a "module" or a "part" which needs to be performed in a specific hardware or in at least one processor, may be integrated to at least one module. A singular expression includes a plural expression, unless otherwise specified.

In describing the disclosure, the order of respective operations is to be understood as non-limiting unless the order of the respective operations needs to be performed such that a preceding operation must be performed logically and temporally prior to a following operation. That is, except for exceptional cases as described above, even if a process described as the following operation is performed preceding a process described as the preceding operation, it does not influence the nature of the disclosure and the scope of protection should also be defined regardless of the order of the operation. Further, when it is described as "A or B" in the disclosure, it is to be defined as referring selectively to not only anyone from among A and B, but also as including both A and B. In addition, the term "comprise" or "include" used herein has the comprehensive meaning of further including another element in addition to the elements listed as being comprised or included.

In the disclosure, only the essential elements necessary in describing the disclosure have been described, and elements unrelated to the nature of the disclosure have not been mentioned. Further, the disclosure is not to be interpreted in an exclusive sense including only the mentioned elements, but in a non-exclusive sense as also including other elements.

In addition to the above, in case it is determined that in describing embodiments, the detailed description of related known technologies may unnecessarily confuse the gist of the disclosure, the detailed description thereof will be abridged or omitted. The respective embodiments may be implemented or operated independently, or the respective embodiments may be implemented or operated in combination.

FIG. 1 is a diagram illustrating an air conditioning system according to an embodiment of the disclosure.

Referring to FIG. 1, the air conditioning system may include an air conditioner 100 and a control device 200.

The air conditioner 100 may be configured to detect indoor environment information. For example, the indoor environment information may include an indoor temperature, an indoor humidity, a user occupancy state, and the like. In addition, the air conditioner 100 may be configured to obtain user control information. For example, the user control information may include an on/off state, an operation mode (e.g., cooling mode, heating mode, dehumidifying mode, etc.), a setting temperature, a setting time, an air volume, a wind direction, a wind speed, and the like.

Further, the air conditioner 100 may be configured to receive outdoor environment information from the control device 200. For example, the outdoor environment information may include an outdoor temperature, an outdoor humidity, a weather, a date, a day of a week, a time, whether or not it is a holiday, and the like. Meanwhile, environment information such as the date, the day of the week, and the time may be included in the indoor environment information.

The air conditioner 100 may be configured to predict an indoor temperature over time through a temperature prediction model trained based on the detected indoor environment information, the received outdoor environment information, and the user control information. The temperature prediction model may predict the indoor temperature by learning the previously collected indoor and outdoor environment information, and the user control information. The temperature prediction model may be generated and trained in the control device 200. Alternatively, the temperature prediction model may be generated and trained in a separate artificial intelligence server (not shown). The temperature prediction model may predict the indoor temperature at respective points-in-time according to pre-set time intervals. In an embodiment, the temperature prediction model may predict the indoor temperature at a 5 minute basis. That is, the temperature prediction model may predict the indoor temperature at 12:10 based on the indoor and outdoor environment information at 12:05 and the user control information.

The air conditioner 100 may be configured to obtain a plurality of corresponding candidate setting temperatures based on the indoor temperature over a predicted time. In an embodiment, based the air conditioner 100 being in a cooling mode and the predicted indoor temperature at a specific point-in-time being 27° C., the candidate setting temperatures may be 26.5° C., 26° C., off, and the like. The air conditioner 100 may be configured to predict the candidate setting temperature at a pre-set temperature interval. For example, based on the pre-set temperature interval being 0.5, the air conditioner 100 may be configured to obtain candidate setting temperatures such as 26.5° C., 26° C., and the like. Based on the pre-set temperature interval being 1, the air conditioner 100 may be configured to obtain candidate setting temperatures such as 26° C., 25° C., and the like. Based on the air conditioner 100 being in a cooling mode, the candidate setting temperatures may be obtained lower than the indoor temperature, and based on being in a heating mode, the candidate setting temperatures may be obtained higher than the indoor temperature.

The air conditioner 100 may be configured to obtain a plurality of temperature control schedules based on the plurality of obtained candidate setting temperatures. The air conditioner 100 may be configured to select one candidate setting temperature at respective points-in-time as a control temperature. The air conditioner 100 may be configured to control the temperature at the respective points-in-time according to the control temperature selected at the respective points-in-time. That is, the temperature control schedule may be a series of sets of control temperatures which connect the control temperature of respective points-in-time, and may refer to a schedule for controlling the temperature for a certain time. The air conditioner 100 may be configured to obtain one temperature control schedule over time based on the selected control temperature at respective points-in-time. As described above, the air conditioner 100 may be configured to obtain a plurality of candidate setting temperatures based on time. The air conditioner 100 may be configured to select various candidate setting temperatures at respective points-in-time as the control temperature. Accordingly, the air conditioner 100 may be configured to obtain the plurality of temperature control schedules which combined the candidate setting temperatures at the respective points-in-time as the control temperature.

The air conditioner 100 may be configured to predict the energy consumption of respective temperature control schedules obtained through a trained energy prediction model. The energy prediction model may predict the energy consumption by learning the temperature control schedule previously input. The energy prediction model may be generated and trained in the control device 200. Alternatively, the energy prediction model may be generated and trained in a separate artificial intelligence server (not shown).

The air conditioner 100 may be configured to identify the temperature control schedule with the smallest predicted energy consumption as an optimal temperature control schedule. For example, based on an energy consumption of a first temperature control schedule being 300 kWh, an energy consumption of a second temperature control schedule being 280 kWh, and an energy consumption of a third temperature control schedule being 320 kWh, the air conditioner 100 may be configured to identify the second temperature control schedule as the optimal temperature control schedule. Then, the air conditioner 100 may be configured to operate during a pre-set power saving operation time according to the identified optimal temperature control schedule. For example, the air conditioner 100 may include an air conditioner, a dehumidifier, an air purifier, a fan heater, an air conditioning facility or system, and the like. Further, the power saving operation time may refer to when there are no occupants or when there are only some occupants present. For example, the power saving operation time may include an office lunch hour or a user unoccupied time of a meeting room which is infrequently used, a hotel room with no people during midday, and the like. An example of the air conditioner 100 performing a control operation based on the temperature during a power saving time has been described, but the air conditioner 100 may be configured to perform a control operation by changing the on or off, the air volume, the wind direction, the wind speed, and the like.

The control device 200 may be configured to transmit the outdoor environment information to the air conditioner 100. In addition, the control device 200 may be configured to generate and train the temperature prediction mode and the energy prediction model. In an embodiment, the control device 200 may be implemented with one device, or may be implemented with a plurality of devices. Based on the air conditioning system being implemented with one control device 200, the control device 200 may be configured to transmit the outdoor environment information, the temperature prediction model, and the energy prediction model to the air conditioner 100. Alternatively, the control device 200 may include the temperature prediction model, and the energy prediction model. Further, the control device 200 may be configured to receive the indoor and outdoor environment information, and the control information from the air conditioner 100 or from various external devices (or, server). The control device 200 may be configured to predict the indoor temperature over time by using the temperature prediction model trained based on the received indoor and outdoor environment information and the control information. In addition, the control device 200 may be configured to obtain the plurality of temperature control schedules based on the predicted indoor temperature, and predict the energy consumption on the temperature control schedule obtained by using the trained energy prediction model. Alternatively, the control device 200 may be configured to obtain the optimal temperature control schedule based on the predicted energy consumption. The control device 200 may be configured to transmit the obtained optimal temperature control schedule to the air conditioner 100, and the air conditioner 100 may be configured to perform a control operation during the power saving operation time based on the optimal temperature control schedule. For example, the control device 200 may include an electronic device, or the like, configured to control a server, a cloud, and an air conditioner.

Based on the air conditioning system being implemented with the plurality of devices, the control device 200 may include an environment information server transmitting outdoor environment information and the artificial intelligence server generating and training the temperature prediction model and the energy prediction model. Alternatively, the artificial intelligence server may be configured to receive the indoor and outdoor environment information and the control information from the air conditioner, the external device or the external server, predict the indoor temperature, obtain a plurality of temperature control schedules, and obtain an energy consumption prediction on the plurality of temperature control schedules and the optimal temperature control schedule. Alternatively, a first control device configured to transmit environment information such as the outdoor temperature and the outdoor humidity, a second control device configured to transmit environment information such as the weather, a third control device configured to transmit environment information such as the date, the day of the week, time, and whether or not it is a holiday, a fourth control device configured to generate and train the temperature prediction model, a fifth control device configured to generate and train the energy prediction model, and the like may be included.

Alternatively, the air conditioning system may be implemented with one device, and the control device 200 may be configured to receive the outdoor environment information, the temperature prediction model, or the energy prediction model from the various external devices. Further, the control device 200 may be configured to transmit information and the like to the air conditioner 100.

The air conditioner 100 may be configured to identify the optimal temperature control schedule based on the predicted indoor temperature and the predicted energy consumption, and effectively manage energy being consumed during the power saving operation time by operating according to the identified optimal temperature control schedule.

A configuration of the air conditioner 100 will be described below.

Figure 2:
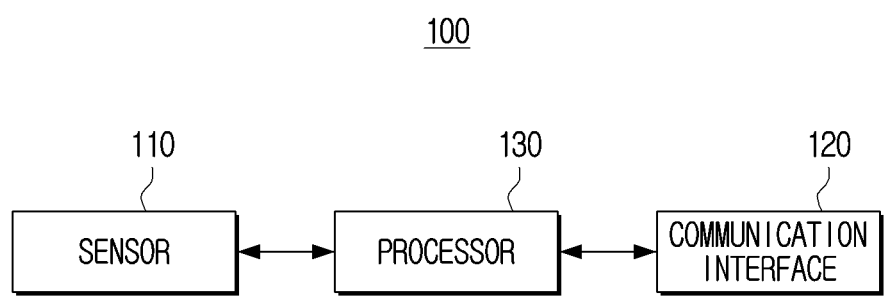
FIG. 2 is a block diagram illustrating a configuration of an air conditioner according to an embodiment of the disclosure.
Figure 3:
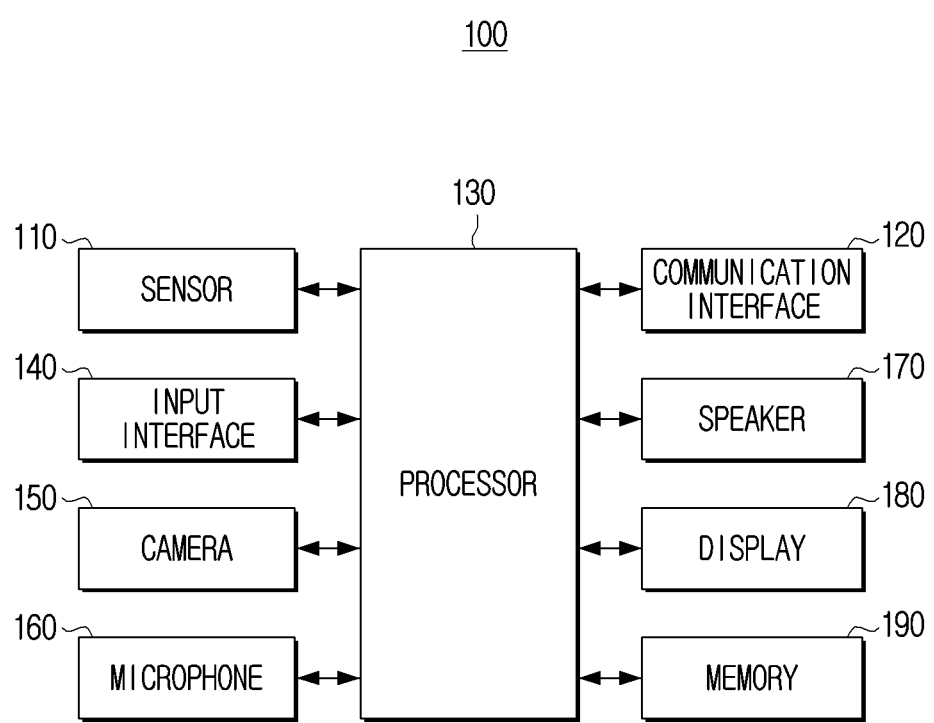
FIG. 3 is a block diagram illustrating a detailed configuration of an air conditioner according to an embodiment of the disclosure.

FIG. 2 is a block diagram illustrating a configuration of an air conditioner according to an embodiment of the disclosure, and FIG. 3 is a block diagram illustrating a detailed configuration of an air conditioner according to an embodiment of the disclosure. The embodiment will be described with reference to FIGS. 2 and 3.

Referring to FIG. 2, the air conditioner 100 may include a sensor 110, a communication interface 120, and a processor 130.

The sensor 110 may be configured to detect the indoor environment information. In addition, the sensor 110 may be configured to detect a number or scale of people positioned indoors. For example, the sensor 110 may include a temperature sensor, a humidity sensor, an atmospheric pressure sensor, a thermal detection sensor, a proximity sensor, a motion sensor, an infrared sensor, an ultrasonic sensor, and the like. Meanwhile, other than the air conditioner 100, an outdoor unit, a cooling tower, a chiller, an automatic Thermostat, a remote controller, and the like may also include the temperature sensor, the humidity sensor, and the like, and detect the indoor and outdoor environment information. Alternatively, the indoor and outdoor environment information may be received from an external device or an external server.

The communication interface 120 may be configured to transmit and receive data (or, information) with the external device. For example, the communication interface 120 may include a data network communication module such as a long term evolution (LTE), wireless fidelity (Wi-Fi), Bluetooth, and the like, and may be configured to perform communication with the external device through a short range communication network and an internet network. The communication interface 120 may be configured to receive the indoor and outdoor environment information, the temperature prediction model, and the energy prediction model from the external device. The communication interface 120 may be configured to perform communication with the control device, and may be referred to as a communicator, a communication module, a transceiver, or the like. Further, the external device may include a general server (cloud), an artificial intelligence server (cloud), an outdoor unit, a cooling tower, a chiller, an automatic Thermostat, a remote controller, a virtual data providing server, and the like.

The processor 130 may be configured to control respective configurations of the air conditioner 100. For example, the processor 130 may be configured to control the sensor 110 to detect the indoor environment information, and control the communication interface 120 to receive data from the external device. In addition, the processor 130 may be configured to obtain the user control information.

The processor 130 may be configured to predict the indoor temperature over time through the temperature prediction model trained based on the indoor and outdoor environment information and the user control information, and obtain the plurality of corresponding candidate setting temperatures based on the predicted indoor temperature over time. The candidate setting temperature may be the control temperature. The plurality of candidate setting temperatures may be a temperature (when in cooling mode) of less than or equal to or a temperature (when in heating mode) of greater than or equal to a change temperature of the indoor temperature which is predicted when the air conditioner 100 is turned-off based on the predicted indoor temperature over time. In an embodiment, when the air conditioner 100 is turned-off, the indoor temperature may change from 26° C. to 27° C. That is, the change temperature of the indoor temperature may be 27° C. When in the cooling mode, the candidate setting temperature may be a temperature lower than 27° C. When in the heating mode, the candidate setting temperature may be a temperature higher than 27° C.

The processor 130 may be configured to obtain the plurality of temperature control schedules based on the plurality of obtained candidate setting temperatures. For example, the processor 130 may be configured to predict the indoor temperature at the respective points-in-time according to according to pre-set time intervals, and obtain the plurality of candidate setting temperatures at the respective points-in-time corresponding to the predicted indoor temperature at the respective points-in-time. The processor 130 may be configured to obtain the plurality of temperature control schedules by combining the obtained plurality of candidate setting temperatures at the respective points-in-time. The processor 130 may be configured to obtain the plurality of temperature control schedules based on a pre-set limiting condition. For example, the pre-set limiting condition may include matching the indoor temperature and the setting temperature, limiting a maximum peak value of energy consumption, limiting energy consumption during the pre-set time, maintaining a pre-set range in comfort level, or the like at the point-in-time the pre-set power saving operation time ends. In an embodiment, the range of comfort level may be calculated by a predicted mean vote (PMV) based on the indoor temperature, an indoor radiation, an indoor humidity, wind speed, clothing index, and the like.

The processor 130 may be configured to predict the energy consumption of the respective temperature control schedules obtained through the trained energy prediction model. For example, the processor 130 may be configured to predict the energy consumption of the respective temperature control schedules during a time until the point at which the temperature or energy consumption matches with a pre-set energy prediction time condition after the pre-set power saving operation time. The power saving operation time may include an office lunch hour, a time other than normal office work hours, a user unoccupied time of a meeting room which is infrequently used, and the like. In an embodiment, based on the lunch hour being from 12:00 p.m. to 1:00 p.m., the power saving operation time may be from 12:00 p.m. to 1:00 p.m. However, if the outdoor temperature is high or if the indoor temperature is high compared to the setting temperature (control temperature) at 1:00 p.m., the air conditioner 100 may be configured to momentarily or for a certain time consume significant energy in order to lower the indoor temperature to the setting temperature. Accordingly, the air conditioner 100 may be configured to predict the energy consumption until the point-in-time a certain condition is satisfied after the power saving operation time. For example, the pre-set energy prediction time condition may be the point-in-time the indoor temperature is predicted as matching with the setting temperature after the pre-set power saving operation time. Alternatively, the pre-set energy prediction time condition may be the point-in-time the indoor temperature is predicted as within a pre-set range with the setting temperature. Alternatively, the pre-set energy prediction time condition may be a condition according to the energy consumption based on the temperature control schedules different from one another or a rate of change of energy consumption. For example, when restarting after is turning-off the air conditioner 100 during the power saving operation time, the energy consumption over time may be referred to as a first energy consumption. Further, when operating the air conditioner 100 within a pre-set temperature range during the power saving operation time, the energy consumption over time may be referred to as a second energy consumption. At this time, the pre-set energy prediction time condition may be a point-in-time the first energy consumption and the second energy consumption are a match or predicted to be within a certain range. Alternatively, the pre-set energy prediction time condition may be a point-in-time the rate of change of the first energy consumption and the rate of change of the second energy consumption are a match or predicted to be within a certain range.

The processor 130 may be configured to identify the temperature control schedule with the smallest predicted energy consumption as the optimal temperature control schedule. The processor 130 may be configured to operate during the pre-set power saving operation time based on the identified optimal temperature control schedule.

The air conditioner 100 may further include a different configuration in addition to the above-described configuration.

Referring to FIG. 3, the air conditioner 100 may include a sensor 110, a communication interface 120, a processor 130, an input interface 140, a camera 150, a microphone 160, a speaker 170, a display 180, and a memory 190.

The input interface 140 may be configured to receive control information and the like of the air conditioner 100 from a user. For example, the input interface 140 may be implemented as a keypad, a touch pad, or the like. The input interface 140 may be configured to perform a function which is received as a command from the user, and may be referred to as an inputter, an input module, or the like. The input interface 140 may be implemented as a sensor 110, a camera 150, a microphone 160, or a display 180 in addition to the above-described keypad and touch pad.

For example, based on the input interface 140 being implemented as the sensor 110, the sensor 110 may be configured to receive a signal or the like of the remote controller. The processor 130 may be configured to obtain the control information based on the input signal. Based on the input interface 140 being implemented as the camera 150, the air conditioner 100 may be configured to capture an expression, a motion, or the like of the user. The processor 130 may be configured to obtain the control information based on the captured expression or motion. Based on the input interface 140 being implemented as the microphone 160, the air conditioner 100 may be configured to receive a user voice. The processor 130 may be configured to obtain the control information based on the input voice. In addition, based on the display 180 being implemented as the touch screen, the air conditioner 100 may be configured to receive the user control information through the touch screen.

The camera 150 may be configured to capture an image which includes the user. The processor 130 may be configured to check a number of scale of people positioned indoors based on the captured image. The microphone 160 may be configured to receive the user voice.

The speaker 170 may be configured to output an audio. The speaker 170 may be configured to output a user input command, information on a state of the air conditioner 100, information on the operation, and the like as a voice or a notification sound.

The display 180 may be configured to output the user input command, the information on the state of the air conditioner 100, information on the operation, or the like as a text or an image. For example, the display 180 may be implemented as a liquid crystal display (LCD), an organic light emitting diode (OLED), a flexible display, a touch screen, or the like.

The memory 190 may be configured to store data and the like which perform a function of the air conditioner 100, and store a program, instruction, and the like which are operated in the air conditioner 100. Further, the memory 190 may be configured to store the temperature prediction model and the energy prediction model. In addition, the memory 190 may be configured to store an algorithm and the like associated with the indoor and outdoor environment information, the user control information, and the control schedule. Meanwhile, the memory 190 may be configured to store identification information of a user terminal device to identify the user. For example, the memory 190 may be implemented as a type such as a read only memory (ROM), a random access memory (RAM), a hard disk drive (HDD), a solid state drive (SSD), a memory card, and the like.

The air conditioner 100 may include all configurations described above, or may include a part of the configurations. In addition, the air conditioner 100 may further include other configurations performing various functions in addition to the configurations described above.

The function associated with the artificial intelligence according to the disclosure may be operated through the processor 130 and the memory 190. In an embodiment, the processor 130 may be comprised of one or a plurality of processors. The one or plurality of processor may be a generic use processor such as a central processing unit (CPU), an application processor (AP), or a digital signal processor (DSP), a graphics dedicated processor such as a graphic processing unit (GPU) or a vision processing unit (VPU), or an artificial intelligence dedicated processor such as a neural processing unit (NPU). The one or plurality of processors may control for the input data to be processed according to a pre-defined operation rule or an artificial intelligence model stored in the memory 190. Alternatively, if the one or plurality of processors is an artificial intelligence dedicated processor (or, an interconnected AI cloud), the artificial intelligence dedicated processor may be designed to a hardware structure specializing in the processing of a specific artificial intelligence model.

The pre-defined operation rule or the artificial intelligence model is characterized by being created through learning. The being created through learning referred herein refers to the pre-defined operation rule or artificial intelligence model being created, both of which are set to perform a desired feature (or, purpose) because the basic artificial intelligence module is trained by a learning algorithm using a plurality of learning data. The learning may be carried out in the machine itself in which the artificial intelligence according to the disclosure is performed, or carried out through a separate server and/or system. Examples of the learning algorithm may include a supervised learning, an unsupervised learning, a semi-supervised learning, or a reinforcement learning, but is not limited to the above-described examples.

The artificial intelligence model may be comprised of a plurality of neural network layers. The respective neural network layers may include a plurality of weight values, and may perform neural network processing through processing between the processing results of a previous layer and the plurality of weight values. The plurality of weight values comprised by the plurality of neural network layers may be optimized by the learning result of the artificial intelligence model. For example, the plurality of weight values may be updated for a loss value or a cost value obtained by the artificial intelligence model during the learning process to be reduced or optimized. The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

Figure 4:
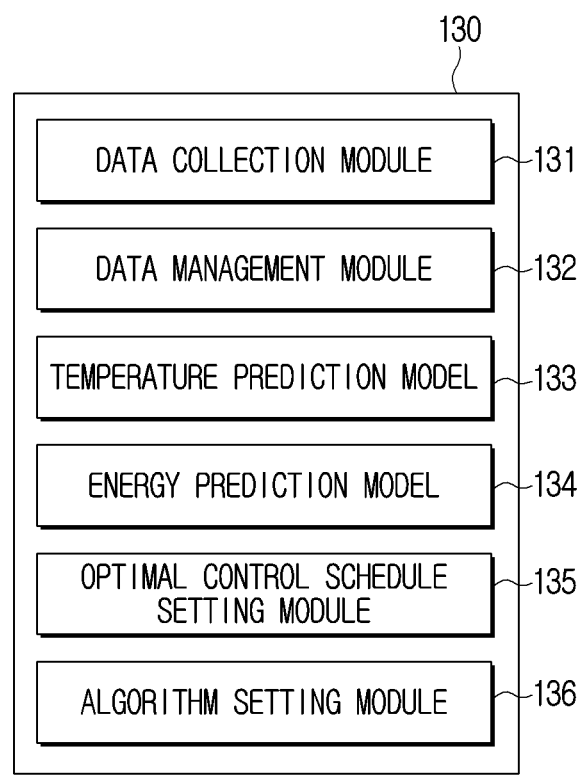
FIG. 4 is a diagram illustrating a configuration operating in a processor according to an embodiment of the disclosure.

FIG. 4 is a diagram illustrating a configuration operating in a processor according to an embodiment of the disclosure.

Referring to FIG. 4, the air conditioner 100 may include a data collection module 131, a data management module 132, a temperature prediction model 133, an energy prediction model 134, an optimal control schedule setting module 135, and an algorithm setting module 136. The respective modules or models may be stored in the memory. The processor may be configured to perform functions by loading the respective modules or models to identify the optical temperature control schedule.

The data collection module 131 may be configured to collect data necessary in the algorithm operation. The data collection module 131 may be configured to collect data such as the indoor and outdoor environment information from the sensor or the external device. The data management module 132 may be configured to store and manage the collected data. If necessary, the data management module 132 may be configured to process and use the data.

The temperature prediction model 133 may predict the indoor temperature of a next operation. The temperature prediction model 133 may predict a certain temperature (setback temperature) range according to the indoor temperature which is changed when the air conditioner 100 is turned-off. In addition, the predicted temperature range may be used as an input of the energy prediction model. In addition, the temperature prediction model 133 may determine whether the predicted temperature violates the limiting condition. The energy prediction model 134 may identify the schedule with the smallest energy consumption from among the plurality of temperature control schedules when operating the algorithm. The output of the energy prediction model 134 may be the energy consumption when controlled with the input control schedule. In some cases, the energy prediction model 134 may determine whether the predicted energy consumption violates the limiting condition.

The optimal control schedule setting module 135 may be configured to identify a schedule with the smallest energy consumption and does not violate the limiting condition from among the plurality of control schedules based on the temperature prediction model 133 and the energy prediction model 134. The algorithm setting module 136 may be configured to set respective algorithms to identify an optimal control schedule, and set an operation schedule, a limiting condition, and the like.

The above-described operation may also be performed in the control device.

Figure 5:
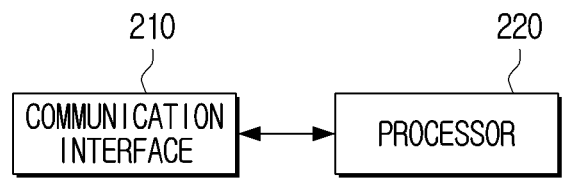
FIG. 5 is a block diagram illustrating a configuration of a control device according to an embodiment of the disclosure.

FIG. 5 is a block diagram illustrating a configuration of a control device according to an embodiment of the disclosure.

Referring to FIG. 5, the control device 200 may include a communication interface 210 and a processor 220.

The communication interface 210 may be configured to transmit and receive data (or, information) with the external device. For example, the communication interface 120 may include a data network communication module such as LTE, Wi-Fi, Bluetooth, and the like, and may be configured to perform communication with the external device through a short range communication network and an internet network. The communication interface 120 may be configured to receive the indoor and outdoor environment information and the user control information from the external device.

For example, the indoor and outdoor environment information may include the indoor temperature, the indoor humidity, the user occupancy state, the outdoor temperature, the outdoor humidity, the weather, the date, the day of the week, the time, whether or not it is a holiday, and the like. The user control information may include the on/off state, the operation mode (e.g., cooling mode, heating mode, dehumidifying mode, etc.), the setting temperature, the setting time, the air volume, the wind direction, the wind speed, and the like. Further, the external device may include the air conditioner, the general server (cloud), the outdoor unit, the cooling tower, the chiller, the automatic Thermostat, the remote controller, the virtual data providing server, and the like. In an embodiment, the communication interface 210 may be configured to receive the indoor environment information and the user control information from the air conditioner. Alternatively, the communication interface 210 may be configured to receive the indoor environment information from the automatic Thermostat and the remote controller. In addition, the communication interface 210 may be configured to receive the outdoor environment information from the general server (cloud), the outdoor unit, the cooling tower, the chiller, the virtual data providing server, and the like. The communication interface 210 may be configured to perform communication with the external server, and may be referred to as the communicator, the communication module, the transceiver, and the like.

The processor 220 may be configured to control the respective configurations of the control device 200. For example, the processor 220 may be configured to control the communication interface 210 to receive the indoor and outdoor environment information and the user control information. The processor 220 may be configured to generate and train the temperature prediction model and the energy prediction model. Further, the processor 220 may be configured to identify the optimal temperature control schedule by using the temperature prediction model and the energy prediction model.

For example, the processor 220 may be configured to predict the indoor temperature over time through the temperature prediction model trained based on the received indoor and outdoor environment information and the user control information. Further, the processor 220 may be configured to obtain the plurality of corresponding candidate setting temperatures based on the predicted indoor temperature over time. In an embodiment, based on the processor 220 turning-off the air conditioner through the trained temperature prediction model, the indoor temperature changed compared to the previous point-in-time may be predicted. When in the cooling mode, the processor 220 may be configured to obtain a temperature lower than the predicted change temperature of the indoor temperature as the candidate setting temperature. Alternatively, when in the heating mode, the processor 220 may be configured to obtain a temperature higher than the predicted change temperature of the indoor temperature as the candidate setting temperature. The candidate setting temperature obtained at a specific point-in-time may be in plurality. The processor 220 may be configured to obtain the plurality of temperature control schedules based on the plurality of obtained candidate setting temperatures. That is, the processor 220 may be configured to predict the indoor temperature at the respective points-in-time according to the pre-set time intervals, and obtain the plurality of candidate setting temperatures at the respective points-in-time which corresponds to the predicted indoor temperature at the respective points-in-time. Further, the processor 220 may be configured to obtain the plurality of temperature control schedules by combining the plurality of obtained candidate setting temperatures at the respective points-in-time.

The processor 220 may be configured to obtain the plurality of temperature control schedules based on the pre-set limiting condition. For example, the pre-set limiting condition may include a condition of the indoor temperature and the pre-set setting temperature matching at the point-in-time the pre-set power saving operation time ends, a condition of limiting the maximum peak value of energy consumption, a condition of limiting energy consumption during a pre-set time, a condition of maintaining a pre-set range in comfort level, or the like.

The processor 220 may be configured to predict the energy consumption of the respective temperature control schedules obtained through the trained energy prediction model. For example, the processor 220 may be configured to predict the energy consumption of the respective temperature control schedules during the time until the point at which the temperature or energy consumption matches with a pre-set energy prediction time condition after the pre-set power saving operation time. The energy prediction time condition may include a point-in-time at which the indoor temperature is predicted to match with the setting temperature after the pre-set power saving operation time, a point-in-time at which the indoor temperature is predicted as within a pre-set range with the setting temperature, point-in-time at which the first energy consumption over time when restarting by turning-off the air conditioner during the pre-set power saving operation time is predicted to match the second energy consumption over time when operating the air conditioner in the pre-set temperature range during the pre-set power saving operation time, a point-in-time at which the first energy consumption and the second energy consumption are predicted to be within the pre-set range, or the like. Alternatively, the pre-set energy prediction time condition may include a point-in-time the rate of change of the first energy consumption and the rate of change of the second energy consumption are a match or predicted to be within the pre-set range.

The processor 220 may be configured to identify the predicted temperature control schedule with the smallest energy consumption as the optimal temperature control schedule. Further, the processor 220 may be configured to control the communication interface to transmit the control information over time to the air conditioner during the pre-set power saving operation time based on the identified optimal temperature control schedule. In an embodiment, based on the optimal temperature control schedule being 26° C. at 12:10 and 26.5° C. at 12:15, the control device 200 may be configured to transmit the control information of being 26° C. at 12:10 (or, before 12:10) to the air conditioner. Then, the control device 200 may be configured to transmit the control information of being 26.5° C. at 12:15 (or, before 12:15) to the air conditioner.

Meanwhile, although an example of the control device 200 transmitting control information on the temperature during the power saving time has been described, the control device 200 may be configured to transmit the control information on the on/off state, the air volume, the wind direction, the wind speed, and the like to the air conditioner.

In the above, the respective configurations of the air conditioner 100 and the control device 200 have been described.

Figure 6:
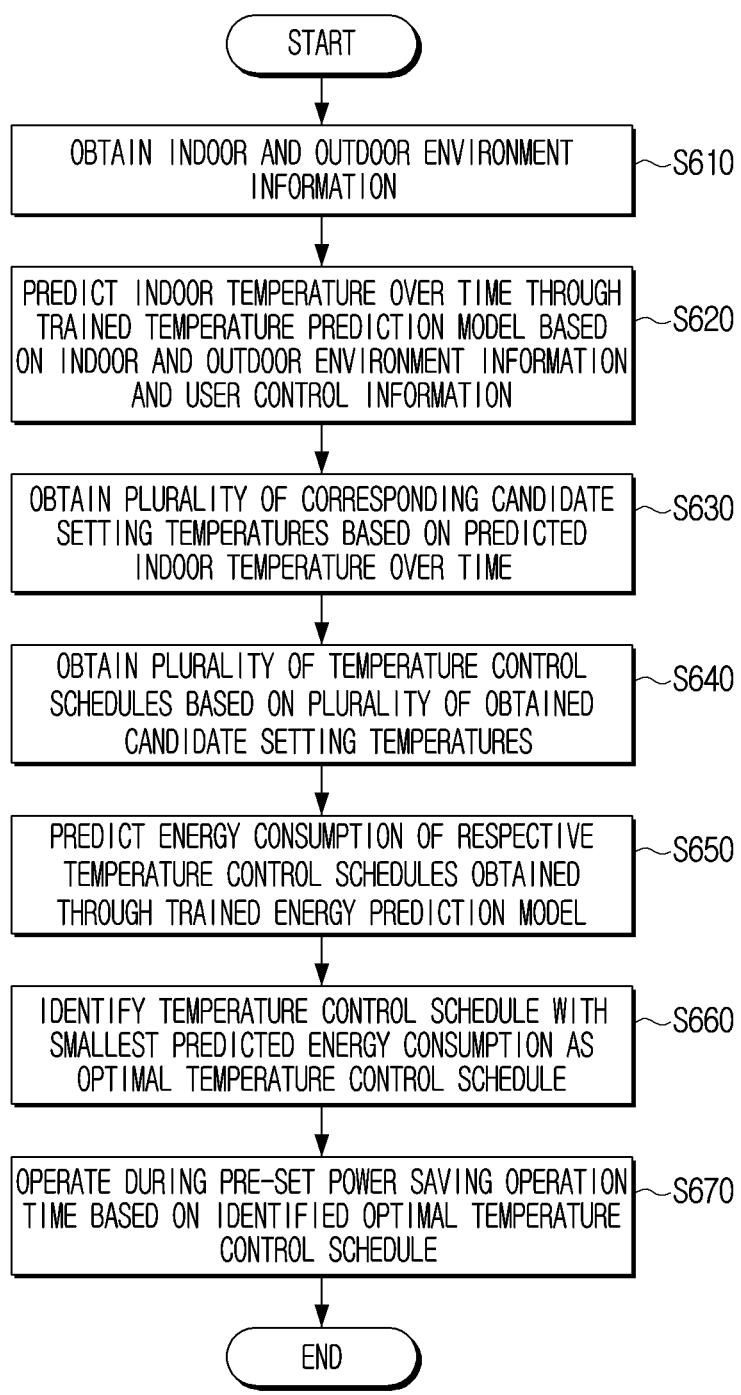
FIG. 6 is a flowchart illustrating a control process of an air conditioner according to an embodiment of the disclosure.

FIG. 6 is a flowchart illustrating a control process of an air conditioner according to an embodiment of the disclosure.

Referring to FIG. 6, the air conditioner may be configured to obtain the indoor and outdoor environment information at operation S610. For example, the environment information may include the indoor and outdoor temperature, the indoor and outdoor humidity, the date, the day of the week, the time, whether or not it is a holiday, whether or not a user is present, or the like. The air conditioner may be configured to predict the indoor temperature over time through the temperature prediction model trained based on the obtained indoor and outdoor environment information and the user control information at operation S620. For example, the user control information may include the on/off state, the operation mode (e.g., cooling mode, heating mode, dehumidifying mode, etc.), the setting temperature, the setting time, the air volume, the wind direction, the wind speed, and the like.

The air conditioner may be configured to obtain the plurality of corresponding candidate setting temperatures based on the predicted indoor temperature over time at operation S630. For example, the plurality of candidate setting temperatures may be a temperature (when in cooling mode) of less than or equal to or a temperature (when in heating mode) of greater than or equal to a change temperature of the indoor temperature which is predicted when the air conditioner is turned-off based on the predicted indoor temperature over time. In addition, the air conditioner may be configured to predict the indoor temperature at respective points-in-time according to the pre-set time intervals, and obtain the plurality of candidate setting temperatures at the respective points-in-time corresponding to the predicted indoor temperature at the respective points-in-time.

The air conditioner may be configured to obtain the plurality of temperature control schedules based on the plurality of obtained candidate setting temperatures at operation S640. For example, the air conditioner may be configured to obtain the plurality of temperature control schedules by combining the obtained plurality of candidate setting temperatures at the respective points-in-time. The air conditioner may be configured to obtain the plurality of temperature control schedules based on the pre-set limiting condition. For example, the pre-set limiting condition may include matching of the indoor temperature with the setting temperature at the point-in-time the pre-set power saving operation ends, limiting the maximum peak value of energy consumption, limiting energy consumption during a pre-set time, maintaining a pre-set range in comfort level, or the like. Alternatively, the air conditioner may be configured to obtain the candidate setting temperature according to the limiting condition in the candidate setting temperature obtaining operation.

The air conditioner may be configured to predict the energy consumption of the respective temperature control schedules obtained through the trained energy prediction model at operation S650. For example, the air conditioner may be configured to predict the energy consumption of the respective temperature control schedules during the time until the point at which the temperature or the energy consumption matches with the pre-set energy prediction time condition after the pre-set power saving operation time. The pre-set power saving operation time may refer to a time in which the temperature, and the like is controlled according to the control schedule, and the pre-set energy prediction time may be a certain time including the power saving operation time. In an embodiment, the pre-set energy prediction time condition may be a point-in-time at which the indoor temperature matches with the setting temperature or is predicted to be within a certain range after the pre-set power saving operation time. Alternatively, the pre-set energy prediction time condition may be a point-in-time at which the first energy consumption according to a schedule of restarting after turning-off the air conditioner during the power saving operation time and the second energy consumption according to a schedule of operating the air conditioner within the pre-set temperature range during the power saving operation time are a match or predicted to be within a certain range. Alternatively, the pre-set energy prediction time condition may include a point-in-time the rate of change of the first energy consumption and the rate of change of the second energy consumption are a match or predicted to be within the pre-set range.

The air conditioner may be configured to identify the temperature control schedule with the smallest predicted energy consumption as the optimal temperature control schedule at operation S660, and operate during the pre-set power saving operation time based on the identified optimal temperature control schedule at operation S670.

Through the above-described process, the air conditioner may provide the user with a comfortable environment as quickly as possible after the power saving time, and reduce energy consumption according to an efficient control schedule.

Below, a detailed embodiment of identifying the optimal temperature control schedule by the air conditioner will be described.

Figure 7:
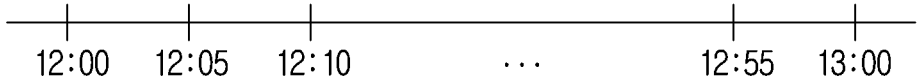
FIG. 7 is a diagram illustrating an embodiment of predicting an indoor temperature and a candidate setting temperature according to an embodiment of the disclosure.
Figure 8:
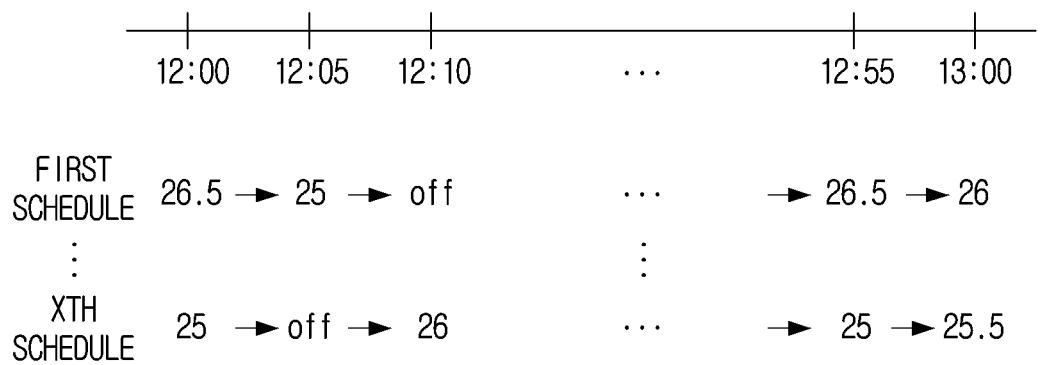
FIG. 8 is a diagram illustrating an embodiment of obtaining a temperature control schedule according to an embodiment of the disclosure.

FIG. 7 is a diagram illustrating an embodiment of predicting an indoor temperature and a candidate setting temperature according to an embodiment of the disclosure, and FIG. 8 is a diagram illustrating an embodiment of obtaining a temperature control schedule according to an embodiment of the disclosure. The embodiment will be described with reference to FIGS. 7 and 8.

Referring to FIGS. 7 and 8, an example of the power saving operation time being from 12:00 to 13:00 is illustrated. The air conditioner may be configured to predict the indoor temperature according to certain time intervals. In an embodiment, the air conditioner as illustrated in FIG. 7 may be configured to predict the indoor temperature at 5 minute intervals. That is, the air conditioner may be configured to predict the indoor temperature as 26° C. at 12:00, 26.5° C. at 12:05, and 27° C. at 13:00. The air conditioner may be configured to predict the indoor temperature in the turned-off condition during the power saving operation time. Alternatively, the air conditioner may be configured to predict the indoor temperature under the condition of being controlled at a certain temperature during the power saving operation time.

The air conditioner may be configured to obtain the plurality of candidate setting temperatures at respective points-in-time at which the indoor temperature is predicted. In an embodiment, the air conditioner may be configured to obtain the candidate setting temperatures at a 0.5° C. basis. Accordingly, when in the cooling mode, the air conditioner may be configured to obtain the candidate setting temperatures of 25.5° C., 25° C. and 24.5° C. at 12:00. Then, the air conditioner may be configured to obtain the candidate setting temperatures of 26° C., 25.5° C. and 25° C. at 12:05. The air conditioner may be configured to obtain the plurality of candidate setting temperatures based on the indoor temperature predicted at every 5 minutes in the same method.

The air conditioner may be configured to obtain the plurality of candidate setting temperatures based on the temperature used in the previous schedule control. The air conditioner may be configured to obtain candidate setting temperatures when in the cooling mode (−) and when in the heating mode (+) based on the temperature used in the previous schedule control. For example, based on the temperature used in the previous cooling mode schedule control being 26° C., the candidate setting temperatures may include 25.5° C., 25° C., 24.5° C., and the like.

Referring to FIG. 8, the air conditioner may be configured to obtain the temperature control schedule which connects the candidate setting temperatures at the respective points-in-time consecutively. In an embodiment, the air conditioner may be configured to obtain a first schedule which connects the setting temperatures of 26.5° C. at 12:00, 25° C. at 12:05, turned-off at 12:10, 26.5° C. at 12:55, and 26° C. at 13:00. In addition, the air conditioner may be configured to obtain a second schedule which connects the setting temperatures of 25° C. at 12:00, turned-off at 12:05, 26° C. at 12:10, 25° C. at 12:55, and 25.5° C. at 13:00. That is, the air conditioner may be configured to obtain the temperature control schedule by selecting one temperature from among the candidate setting temperatures at 12:00, selecting one temperature from among the candidate setting temperatures at 12:05, selecting one temperature from among the candidate setting temperatures at 12:10, and selecting one temperature from among the candidate setting temperatures at 13:00. The air conditioner may be configured to obtain the plurality of temperature control schedules in the same method.

Figure 9:
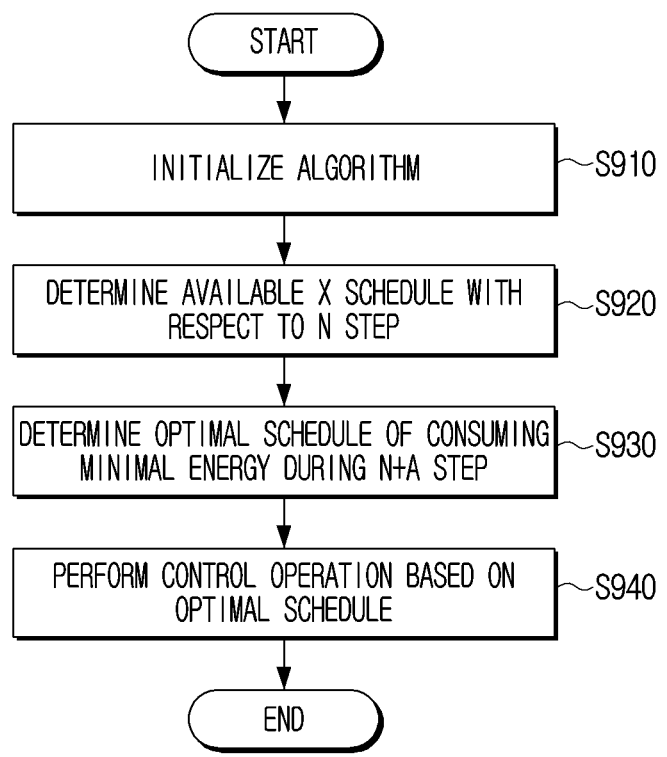
FIG. 9 is a flowchart illustrating a process of controlling an air conditioner by identifying an optimal temperature control schedule according to an embodiment of the disclosure.

FIG. 9 is a flowchart illustrating a process of controlling an air conditioner by identifying an optimal temperature control schedule according to an embodiment of the disclosure.

Referring to FIG. 9, a flowchart illustrating a process of the embodiment described in FIGS. 7 and 8 is shown. Referring to FIG. 9, when an algorithm identifying the optimal temperature control schedule is in operation, the air conditioner may initialize the related setting at operation S910. The air conditioner may apply the algorithm to determine available schedules (number of possible cases) of an x number with respect to an n operation for obtaining the temperature control schedule at operation S920. For example, the n operation may refer to the power saving operation time and a number of times the temperature is controlled based on a time interval. In the case of FIGS. 7 and 8, because the power saving operation time is 1 hour (from 12:00 to 13:00) and the time interval is 5 minutes, n may be 12. Then, the air conditioner may be configured to determine the first schedule, the second schedule, and an x schedule based on the candidate setting temperatures at the respective points-in-time.

The air conditioner may be configured to determine one temperature control schedule which includes the consumption of consuming minimum energy from among the schedules of an x number during an n+a operation at operation S930. In an embodiment, if the power saving operation time is 1 hour (from 12:00 to 13:00), the time interval is 5 minutes, and the additional time for predicting the energy consumption is 30 minutes, n may be 12, and a may be 6. Accordingly, because the n+a is 18, the air conditioner may be configured to predict the energy consumption with respect to the respective temperature control schedules during the 18 operation. Then, the air conditioner may be configured to perform a control operation based on the determined optimal temperature control schedule at operation S940.

A detailed example of predicting energy consumption will be described below.

Figure 10:
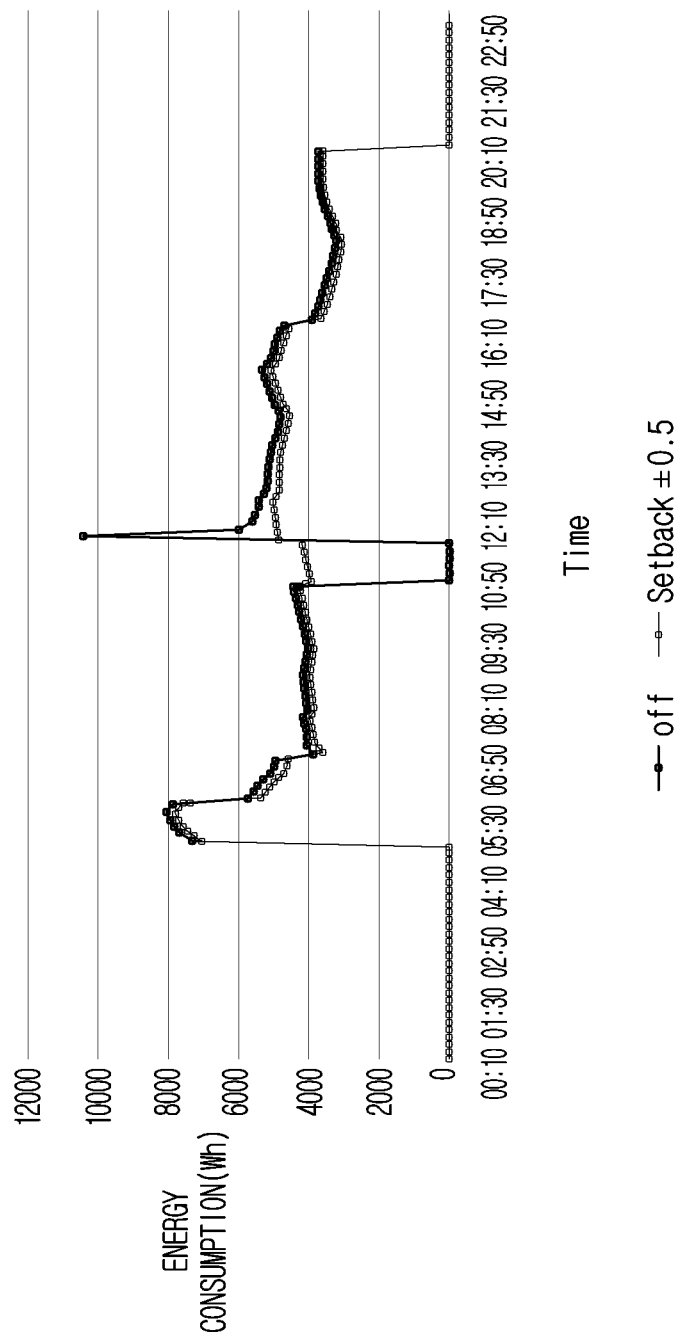
FIG. 10 is an embodiment illustrating energy consumption in an off control method and a setback control method according to an embodiment of the disclosure.
Figure 11:
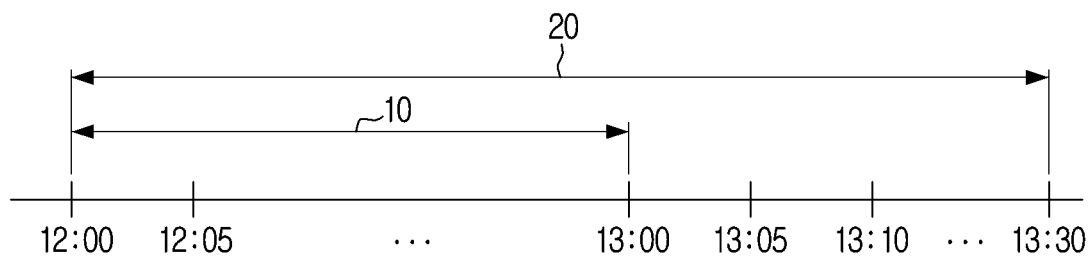
FIG. 11 is a diagram illustrating an embodiment of predicting energy consumption according to an embodiment of the disclosure.

FIG. 10 is an embodiment illustrating energy consumption in an off control method and a setback control method according to an embodiment of the disclosure, FIG. 11 is a diagram illustrating an embodiment of predicting energy consumption according to an embodiment of the disclosure, and FIG. 12 is a diagram illustrating a process of obtaining a temperature control schedule which considers a limiting condition according to an embodiment of the disclosure. The embodiment will be described with reference to FIGS. 10 to 12.

Referring to FIG. 10, the energy consumption of when the air conditioner is turned-off and when the setting temperature is controlled (setback control) to a 0.5° C. range with the energy consumption is illustrated. As illustrated in FIG. 10, when the air conditioner is turned-off during the power saving operation time, the energy consumption may be 0. However, when the air conditioner is turned-on after the power saving operation time, the energy consumption may be increased to a peak value. Accordingly, in terms of energy consumption, not only the power saving operation time but also up until a certain time may be taken into consideration. For example, the energy prediction time may be a time until the point-in-time at which the indoor temperature is predicted as matching with the setting temperature after the power saving operation time, the point-in-time at which the first energy consumption when being turned-off and the second energy consumption when performing setback control is predicted as matching, and the point-in-time at which the rate of change of the first energy consumption and the second energy consumption is predicted as matching.

Referring to FIG. 11, the power saving operation time 10 and the energy consumption prediction time 20 are illustrated. As illustrated in FIG. 11, the power saving operation time 10 may be from 12:00 to 13:00. However, the energy consumption prediction time 20 may be from 12:00 to 13:30.

When the air conditioner predicts the energy consumption, the limiting condition may be considered. For example, the limiting condition may include the matching of the indoor temperature and the setting temperature at the point-in-time the power saving operation time ends, the limiting of the maximum peak value of energy consumption, the limiting of the total energy consumption, the maintaining of the pre-set range in comfort level, or the like.

Referring to FIG. 12, five temperature control schedules in which respective peak values different from one another and the total energy consumption are predicted are shown as an embodiment. If the limiting condition is a condition of the peak value being less than or equal to 10 kWh, the air conditioner may be configured to identify the optimal temperature control schedule based on the first schedule, the third schedule, and the fifth schedule. Alternatively, if the limiting condition is the energy consumption being less than or equal to 350 kWh during a certain time, the air conditioner may be configured to identify the optimal temperature control schedule based on the second schedule and the fourth schedule.

In the above, an embodiment of predicting the energy consumption taking into consideration the limiting condition has been described. An algorithm setting process taking into consideration the limiting condition will be described below.

Figure 13:
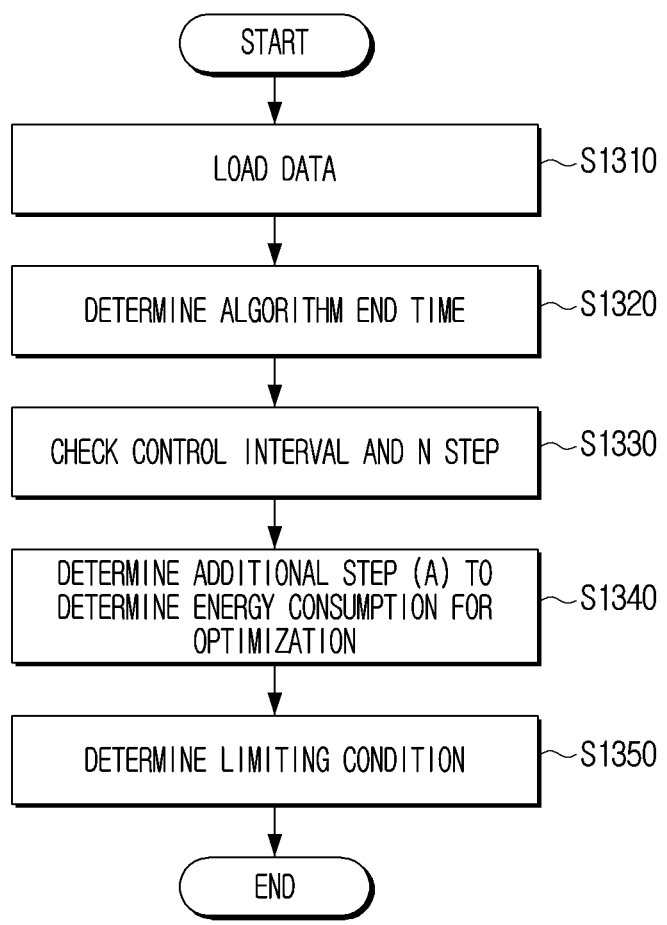
FIG. 13 is a flowchart illustrating a process of setting an algorithm of obtaining a temperature control schedule according to an embodiment of the disclosure.

FIG. 13 is a flowchart illustrating a process of setting an algorithm of obtaining a temperature control schedule according to an embodiment of the disclosure.

Referring to FIG. 13, the air conditioner may be configured to obtain and load necessary data at operation S1310. For example, the necessary data may include the indoor temperature, the outdoor temperature, the indoor humidity, the outdoor humidity, a weather forecast, the day of the week, whether or not it is a holiday, the date, the time, and the like. The air conditioner may be configured to determine the algorithm end time at operation S1320. That is, the air conditioner may be configured to determine a time of return after being unoccupied. For example, the algorithm end time may be input by the user.

The air conditioner may be configured to determine a control interval (control cycle) and an n operation until the time of return based on a control time (power saving operation time) at operation S1330. That is, the air conditioner may be configured to determine how many number of controls are necessary. For example, if the unoccupied time is from 12:00 to 13:00 and the control cycle is 5 minutes, the air conditioner may be configured to determine as twelve controls (12 operation) being necessary.

The air conditioner may be configured to determine an additional operation (a) to determine the energy consumption for optimization at operation S1340. That is, the air conditioner may be configured to determine the time for considering the minimization of energy consumption from the return time after being unoccupied (time at which persons within the space are in occupation). As described above, the additional operation may be a different time from the unoccupied time (power saving operation time). That is, the additional time (additional operation) may refer to a time from the point-in-time at which the user starts to occupy a space to the point-in-time at which the energy consumption forms a general pattern. For example, if the air conditioner of an unoccupied space is turned-off from 12:00 to 13:00 on a hot summer day, the energy consumed by the air conditioner may be significantly increased to lower the indoor temperature as illustrated in FIG. 10. Further, if the air conditioner shows a consumption pattern similar in form as with the usual energy consumption pattern from 14:50, the additional time to predict the energy consumption may be 1 hour and 50 minutes from 13:00 to 14:50. Further, if the control cycle is 5 minutes, the additional operation (a) may be 22 operation.

The air conditioner may be configured to determine the limiting condition at operation S1350. The limiting condition may include conditions such as the previous schedule describing how to operate after return, what environment it is to be until the return time, and how much or more the energy consumption is not to be. Although, the air conditioner has been illustrated as determining the limiting condition in the end in FIG. 13, the order of determining the limiting condition may be varied such as determining at the initializing of the algorithm in FIG. 9 at operation S910.

Figure 14:
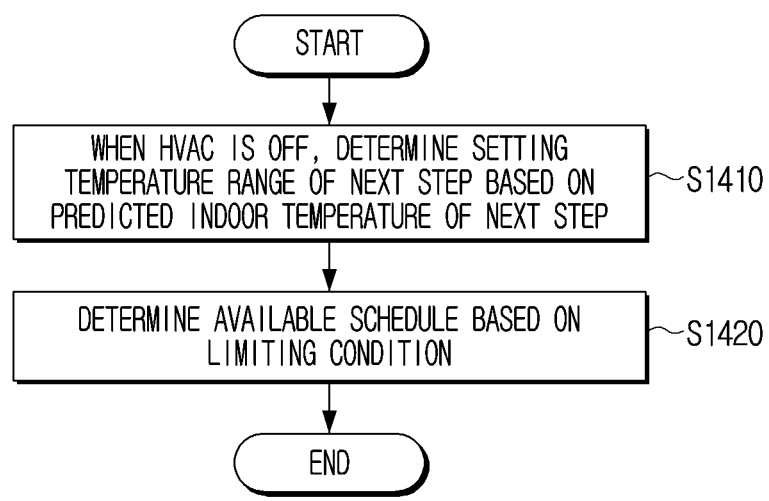
FIG. 14 is a flowchart illustrating a process of generating a temperature control schedule according to an embodiment of the disclosure.

FIG. 14 is a flowchart illustrating a process of generating a temperature control schedule according to an embodiment of the disclosure.

Referring to FIG. 14, when the air conditioning system (Heating, Ventilation & Air Conditioning (HVAC)) is turned-off at the current point-in-time, the air conditioner may be configured to predict and utilize the changes in the indoor temperature. For example, the air conditioner may be configured to determine the setting temperature range based on the predicted indoor temperature of the next operation in the currently off state at operation S1410. That is, the air conditioner may be configured to determine the candidate setting temperatures based on the predicted indoor temperature. For example, if the air conditioner is configured to control from 12:00 to 13:00 at 5 minute intervals, a control instruction on 12 operations from 12:00, 12:05, 12:10, ... to until 12:55 is necessary. Referring to FIG. 7, a control sequence of 12 operations may include various numbers of possible cases.

Further, as illustrated in FIG. 8, the air conditioner may generate an x number of available series of control instruction sets. That is, the air conditioner may generate an x number of temperature control schedules. The air conditioner may be configured to, when determining the control of the n operation, set respective control items. For example, the control item may include the setting temperature, the cooling and heating mode, the power (on/off), the air volume, and the like. The setting temperature (candidate setting temperature) may be determined when in the cooling mode +i and when in the heating mode −i to the temperature used in the previous schedule control. The i may be variously set such as 0.5, 1, 1.5, and the like. However, because infinite possibilities are meaningless and are inefficient to optimization calculation, the air conditioner may be configured to limit the range of setting temperatures by using the temperature prediction model. For example, it may be assumed that the operation currently being calculated is m. The air conditioner may be configured to limit the range of the candidate setting temperatures based on the change in the indoor temperature according to an external environment when an off instruction is provided in the m operation, when determining the candidate setting temperatures for control of an m+1 operation. For example, based on the indoor temperature being predicted as 25° C., if the air conditioner is turned-off, the change in indoor temperature may be predicted. If the predicted indoor temperature is 26° C., it is not necessary for the range of the previous temperature +i to exceed 26° C. This is because the same effect is apparent when turning-off the air conditioner or setting to 26° C. with the setback control.

The air conditioner may be configured to determine the available schedule based on the limiting condition after determining the number of possible cases (temperature control schedule, i.e., series of control instructions of an n number) at operation S1420. As described above, the limiting condition may be conditions such as the previous schedule describing how to operate after return, what environment it is to be until the return time, and how much or more the energy consumption is not to be. The air conditioner may be configured to determine valid temperature control schedules of an x number by repeating the above-described process.

Figure 15:
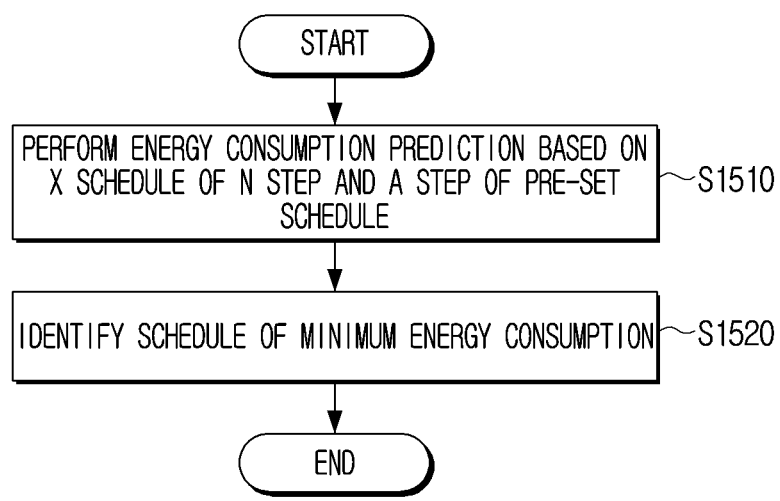
FIG. 15 is a flowchart illustrating a process of determining an optimal temperature control schedule according to an embodiment of the disclosure.

FIG. 15 is a flowchart illustrating a process of determining an optimal temperature control schedule according to an embodiment of the disclosure.

Referring to FIG. 15, the air conditioner may be configured to predict the energy consumption based on an x schedule of an n operation and an operation of a pre-set schedule at operation S1510. The air conditioner may be configured to predict a total energy consumption of an x number of temperature control schedules by using the energy prediction model. The air conditioner may be configured to identify a schedule of a minimum energy consumption at operation S1520. The identified schedule of minimum energy consumption may be the optimal temperature control schedule.

Figure 16A:
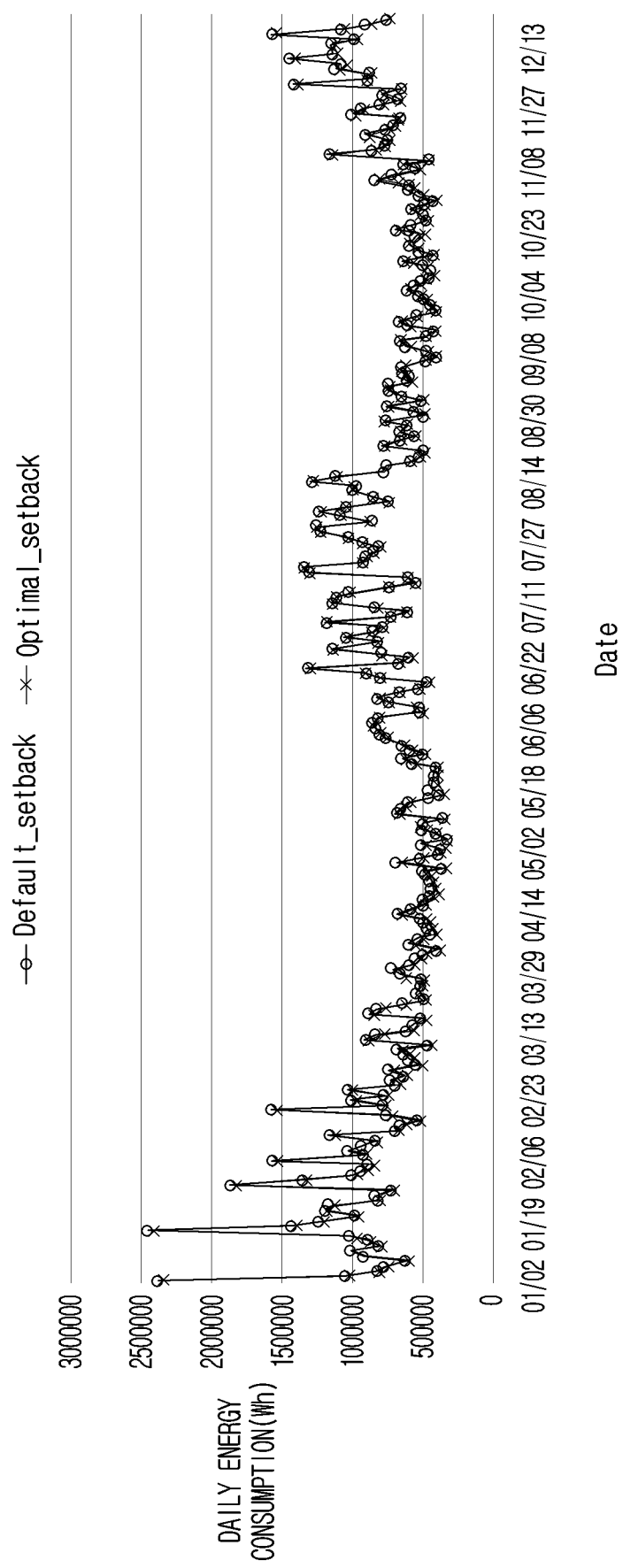
FIG. 16A is a diagram illustrating a simulation result on energy consumption in an office with a lunch hour according to an embodiment of the disclosure.
Figure 16B:
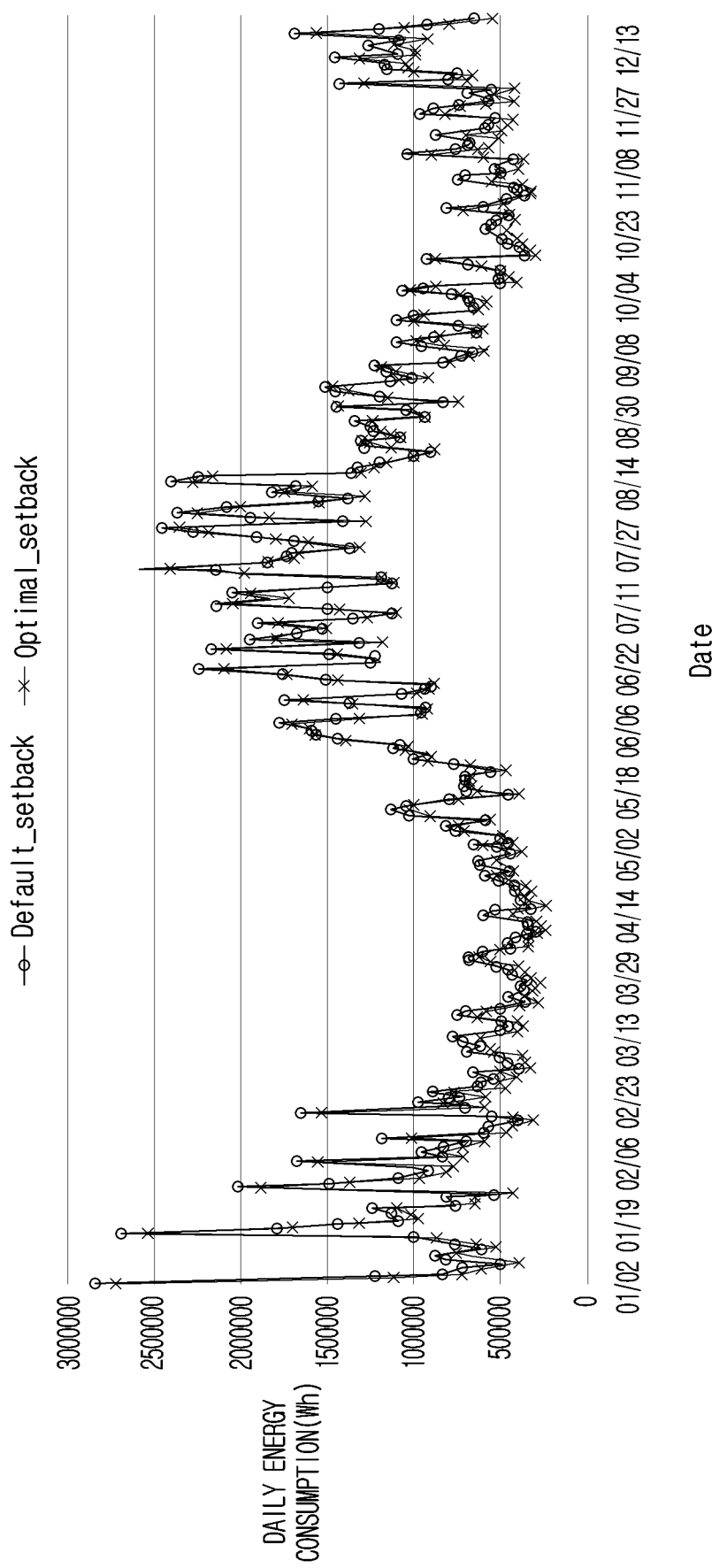
FIG. 16B is a diagram illustrating a simulation result on energy consumption of a meeting room which is used intermittently according to an embodiment of the disclosure.

FIG. 16A is a diagram illustrating a simulation result on energy consumption in an office with a lunch hour according to an embodiment of the disclosure, and FIG. 16B is a diagram illustrating a simulation result on energy consumption of a meeting room which is used intermittently according to an embodiment of the disclosure. The embodiment will be described with reference to FIGS. 16A and 16B.

Referring to FIG. 16A, a rate of energy reduction relative to a basic setback control in an annual simulation is shown as about 3.36%. Specifically, the maximum value of one energy reduction rate may be about 8.34%, and it may be verified that the energy reduction effect of the disclosure may be greatly apparent according to the circumstance.

Referring to FIG. 16B, an energy reduction effect of about 8.73% is apparent in the annual simulation which proceeded based on an intermittent reserved schedule of 09:30 to 12:00, 13:30 to 14:30, and 15:00 to 17:00.

That is, the disclosure describes performing control taking into consideration the energy consumption of the unoccupied time or more by operating the air conditioner with respect to the unoccupied space taking into consideration the energy consumption other than the target temperature. In addition, the disclosure describes optimally controlling the energy consumption with respect to a space when there are no occupants or used intermittently The control method of the control device or the control method of the air conditioner according to the various embodiments described above may be provided as a computer program product. The computer program product may include a software (S/W) program itself or a non-transitory computer readable medium stored with the S/W program.

The non-transitory computer readable medium may refer to a medium that stores data semi-permanently rather than storing data for a very short time, such as a register, a cache, a memory, or the like, and is readable by a device. Specifically, the various applications or programs described above may be stored and provided in a non-transitory computer readable medium such as, for example, and without limitation, a compact disc (CD), a digital versatile disc (DVD), a hard disc, a Blu-ray disc, a USB, a memory card, a ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A control device comprising:
   a transceiver configured to communicate with an air conditioner; and
   a processor,
   wherein the processor is configured to:
      predict an indoor temperature over time through a temperature prediction model trained based on receiving, via the transceiver, indoor and outdoor environment information and user control information, the time includes a first time when person is in occupation and a second time when person is not in occupation, the indoor environment information comprising a number of people positioned indoors at a location of the air conditioner,
      obtain a plurality of corresponding candidate setting temperatures based on the predicted indoor temperature in the first time and the second time,
      obtain a plurality of temperature control schedules based on the plurality of obtained candidate setting temperatures,
      predict energy consumption of the plurality of obtained temperature control schedules, respectively, through a trained energy prediction model,
      identify a temperature control schedule with the smallest predicted energy consumption as an optimal temperature control schedule, and
      reduce power consumption of the air conditioner when the number of people positioned indoors at the location of the air conditioner is zero by controlling the transceiver to transmit control information over time to the air conditioner during the second time based on the identified optimal temperature control schedule.

2. The control device of claim 1, wherein the processor is further configured to:
predict an indoor temperature at respective points-in-time according to a pre-set time interval;
obtain a plurality of candidate setting temperatures at the respective points-in-time corresponding to the predicted indoor temperature at the respective points-in-time; and
obtain the plurality of temperature control schedules by combining the plurality of obtained candidate setting temperatures at the respective points-in-time.

3. The control device of claim 1, wherein the processor is further configured to predict energy consumption of the respective temperature control schedules during a time until a point-in-time at which a temperature or energy consumption matches with a pre-set energy prediction time condition after a pre-set power saving operation time.

4. The control device of claim 3, wherein the pre-set energy prediction time condition is at least one from among a point-in-time at which an indoor temperature is predicted as matching with a setting temperature after the pre-set power saving operation time, a point-in-time at which the indoor temperature is predicted as within a pre-set range with the setting temperature, a point-in-time at which a first energy consumption over time based on restarting after turning-off the air conditioner during the pre-set power saving operation time and a second energy consumption over time based on operating the air conditioner in a pre-set temperature range during the pre-set power saving operation time are predicted as matching, or a point-in-time at which the first energy consumption and the second energy consumption are predicted as being within a pre-set range.

5. The control device of claim 4, wherein the pre-set energy prediction time condition further comprises a condition of a point-in-time at which a rate of change of the first energy consumption and a rate of change of the second energy consumption are predicted as matching or within a pre-set range.

6. The control device of claim 1, wherein the processor is further configured to obtain the plurality of temperature control schedules based on a pre-set limiting condition.

7. The control device of claim 6, wherein the pre-set limiting condition is at least one from among matching of an indoor temperature with a pre-set setting temperature at a point-in-time at which the pre-set power saving operation time ends, limiting a maximum peak value of energy consumption, limiting energy consumption during a pre-set time, or maintaining a pre-set range in comfort level.

8. The control device of claim 1, wherein the plurality of candidate setting temperatures is a temperature less than or equal to a change temperature of the predicted indoor temperature in a cooling mode or temperature greater than or equal to a change temperature of the predicted indoor temperature in a heating mode when the air conditioner is turned-off based on the predicted indoor temperature over time.

9. The control device of claim 1, wherein the indoor and outdoor environment information comprises at least one from among an indoor and outdoor temperature, an indoor and outdoor humidity, a date, a day of a week, a time, whether or not it is a holiday, or whether or not a user is present.

10. An air conditioner comprising:
a sensor configured to detect indoor environment information comprising a number of people positioned indoors;
a transceiver configured to communicate with an external device; and
a processor,
wherein the processor is configured to:
predict an indoor temperature over time through a temperature prediction model trained based on the detected indoor environment information, receiving, via the transceiver, outdoor environment information, and user control information, the time includes a first time when person is in occupation and a second time when person is not in occupation,
obtain a plurality of corresponding candidate setting temperatures based on the predicted indoor temperature in the first time and the second time,
obtain a plurality of temperature control schedules based on the plurality of obtained candidate setting temperatures,
predict energy consumption of the plurality of obtained temperature control schedules, respectively, through a trained energy prediction model,
identify a temperature control schedule with the smallest predicted energy consumption as an optimal temperature control schedule, and
reduce power consumption of the air conditioner when the number of people positioned indoors at a location of the air conditioner is zero by operating during the second time based on the identified optimal temperature control schedule.

11. The air conditioner of claim 10, wherein the processor is further configured to:
predict an indoor temperature at respective points-in-time according to a pre-set time interval;
obtain a plurality of candidate setting temperatures at respective points-in-time corresponding to the predicted indoor temperature at the respective points-in-time; and
obtain the plurality of temperature control schedules by combining the plurality of obtained candidate setting temperatures at the respective points-in-time.

12. The air conditioner of claim 10, wherein the processor is further configured to predict energy consumption of the respective temperature control schedules during a time until a point-in-time at which a temperature or energy consumption matches with a pre-set energy prediction time condition after a pre-set power saving operation time.

13. The air conditioner of claim 12, wherein the pre-set energy prediction time condition is at least one from among a point-in-time at which an indoor temperature is predicted as matching with a setting temperature after the pre-set power saving operation time, a point-in-time at which the indoor temperature is predicted as within a pre-set range with the setting temperature, a point-in-time at which a first energy consumption over time based on restarting after turning-off the air conditioner during the pre-set power saving operation time and a second energy consumption over time based on operating the air conditioner in a pre-set temperature range during the pre-set power saving operation time are predicted as matching, or a point-in-time at which the first energy consumption and the second energy consumption are predicted as being within a pre-set range.

14. The air conditioner of claim 13, wherein the pre-set energy prediction time condition further comprises a condition of a point-in-time at which a rate of change of the first energy consumption and a rate of change of the second energy consumption are predicted as matching or within a pre-set range.

15. A control method performed by an air conditioner, the control method comprising:

obtaining, by the air conditioner, indoor and outdoor environment information, the indoor environment information comprising a number of people positioned indoors at a location of the air conditioner;

predicting, by the air conditioner, an indoor temperature over time through a temperature prediction model trained based on receiving via transceiver indoor and outdoor environment information and user control information, the time includes a first time when person is in occupation and a second time when person is not in occupation;

obtaining, by the air conditioner, a plurality of corresponding candidate setting temperatures based on the predicted indoor temperature in the first time and the second time;

obtaining, by the air conditioner, a plurality of temperature control schedules based on the plurality of obtained candidate setting temperatures;

predicting, by the air conditioner, energy consumption of the plurality of obtained temperature control schedules, respectively, through a trained energy prediction model;

identifying, by the air conditioner, a temperature control schedule with the smallest predicted energy consumption as an optimal temperature control schedule; and reducing power consumption of the air conditioner when the number of people positioned indoors at a location of the air conditioner is zero by operating, by the air conditioner, during the second time based on the identified optimal temperature control schedule.

* * * * *